(12) United States Patent
Tseng et al.

(10) Patent No.: US 7,466,492 B2
(45) Date of Patent: Dec. 16, 2008

(54) IMAGE CAPTURING DEVICE

(75) Inventors: Cheng-Te Tseng, Taipei (TW); Chia-Hsi Tsai, Taipei (TW)

(73) Assignee: Lite-On Technology Corp., Taipei (TW)

( * ) Notice: Subject to any disclaimer, the term of this patent is extended or adjusted under 35 U.S.C. 154(b) by 0 days.

(21) Appl. No.: 12/007,181

(22) Filed: Jan. 8, 2008

(65) Prior Publication Data
US 2008/0165427 A1 Jul. 10, 2008

(30) Foreign Application Priority Data
Jan. 9, 2007 (TW) .............................. 96200383 U

(51) Int. Cl.
G02B 1/06 (2006.01)
G02B 7/02 (2006.01)

(52) U.S. Cl. ................... 359/665; 359/666; 359/811; 359/819

(58) Field of Classification Search ................. 359/665, 359/666, 721, 811, 819
See application file for complete search history.

(56) References Cited

U.S. PATENT DOCUMENTS 6,344,930 B1 * 2/2002 Kaneko et al. .............. 359/666

* cited by examiner

*Primary Examiner*—William C Choi
*Assistant Examiner*—Jack Dinh
(74) *Attorney, Agent, or Firm*—Rosenberg, Klein & Lee

(57) ABSTRACT

An image capturing device includes a base, a lens module, and an electrically conducting mechanism. The lens module includes a fixed lens set and a liquid lens disposed respectively in an adjusting seat with first and second through holes. The liquid lens has first and second electrode portions. The conducting mechanism includes first and second conducting members disposed respectively on outer and inner surfaces of a surrounding wall of the base, a third conducting member abutting against the first electrode portion and extending through the first through hole to contact the first conducting member, and a fourth conducting member abutting against the second electrode portion and extending through the second through hole to contact the second conducting member. When the adjusting seat is rotated relative to the base, the first and second electrode portions of the liquid lens are respectively and electrically connected to the first and second conducting members.

11 Claims, 5 Drawing Sheets

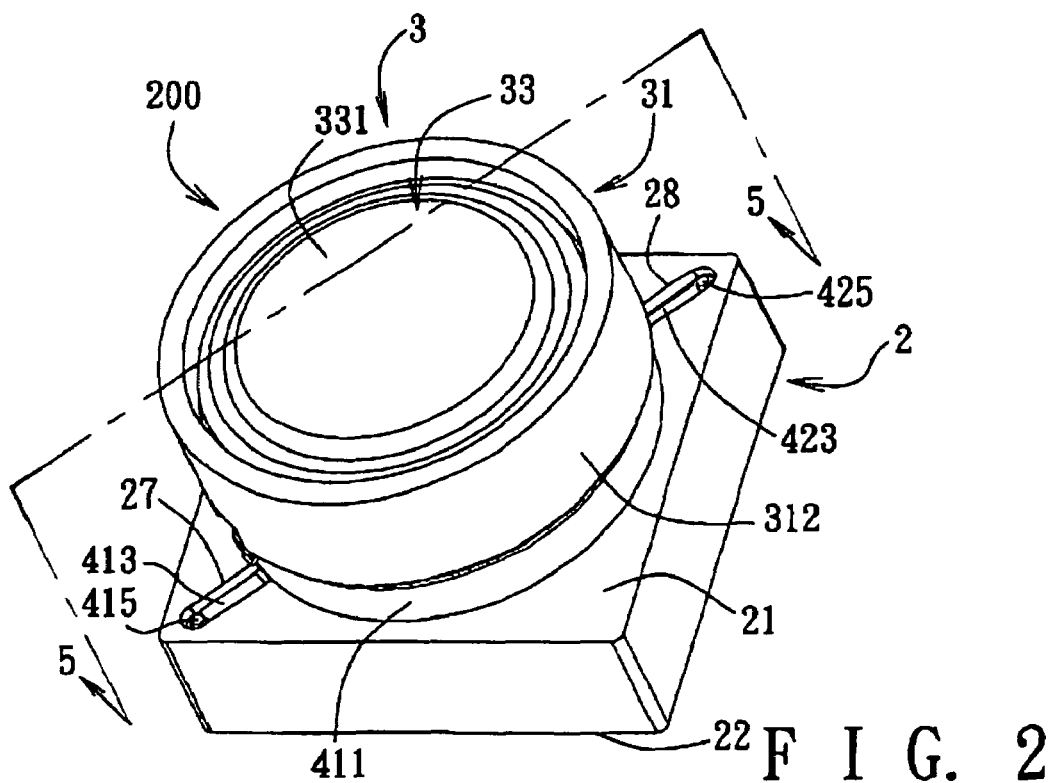
F I G. 2

IMAGE CAPTURING DEVICE

CROSS-REFERENCE TO RELATED APPLICATION

This application claims priority of Taiwanese Application No. 096200383, filed on Jan. 9, 2007.

BACKGROUND OF THE INVENTION

1. Field of the Invention

The invention relates to an image capturing device, more particularly to an electrically conducting mechanism of an image capturing device.

2. Description of the Related Art

As shown in FIG. 1, a conventional image capturing device 1 includes a base 11, a liquid lens 12 disposed in the base 11, a fixed lens 13 disposed in the base 11 and located below the liquid lens 12, an electrical connector 16, and two wires 14, 15 that respectively and electrically connect two electrodes 121, 122 of the liquid lens 12 to the electrical connector 16. During the process of manufacturing the image capturing device 1, both the liquid lens 12 and the fixed lens 13 are mounted in the base 11. The base 11 is then placed on a circuit board (not shown) such that an optical sensor element 17 on the circuit board corresponds to a lower portion of the fixed lens 13, and the wires 14, 15 are connected respectively and electrically to the electrodes 121, 122. Subsequently, the base 11 is rotated to conduct focus adjustment of the fixed lens 13 and the liquid lens 12 until an image outputted by the optical sensor element 17 to a computer screen (not shown) is displayed in a sharpest state. The focus adjusting operation is thus completed. Thereafter, the electrical connector 16 can be inserted into a socket (not shown) of the circuit board such that the circuit board is connected electrically to the liquid lens 12 of the image capturing device 1.

However, during focus adjustment, since the wires 14, 15 are exposed from the base 11, the wires 14, 15 will rotate with the base 11 when the latter is rotated, thereby rendering the focus adjustment inconvenient. Moreover, when the base 11 is rotated to a position where the fixed lens 13 and the liquid lens 12 are adjusted to focus, since the positions of the wires 14, 15 are not fixed and due to length limitation, the electrical connection between the electrical connector 16 and the socket of the circuit board is made more difficult. In addition, since it is not easy to mount the wires 14, 15 in the interior of the base 11, and since the design of the wires 14, 15 cannot be integrated into the interior of the base 11, the complexity and time involved during assembly are increased. Therefore, how to devise an electrically conducting mechanism that is easy to assemble and that can be conveniently connected to the liquid lens 12 is the subject of improvement contemplated by this invention.

SUMMARY OF THE INVENTION

Therefore, a primary object of the present invention is to provide an image capturing device having an electrically conducting mechanism that is easy to assemble.

Another object of the present invention is to provide an image capturing device that permits adjustment of a lens module to an optimum focus during manufacture and that can facilitate focus adjustment.

Accordingly, the image capturing device of the present invention comprises a base, a lens module, and an electrically conducting mechanism.

The base includes a top face, a bottom face, a surrounding wall extending upward from the top face, and an opening formed in the top face and located within the surrounding wall. The bottom face of the base is formed with an access space that is communicated with the opening. The lens module includes an adjusting seat that extends partly through the opening, and that is coupled rotatably to the base, a fixed lens set provided within the adjusting seat, and a liquid lens provided within the adjusting seat. The adjusting seat has spaced-apart first and second throughholes. The liquid lens has first and second electrode portions. The electrically conducting mechanism includes a first conducting member surrounding an outer surface of the surrounding wall, a second conducting member surrounding an inner surface of the surrounding wall, a third conducting member provided within the adjusting seat, abutting against the first electrode portion, and extending partly through the first through hole so as to contact the first conducting member, and a fourth conducting member disposed within the adjusting seat, spaced apart from the third conducting member, abutting against the second electrode portion, and extending partly through the second through hole so as to contact the second conducting member. The first and second electrode portions of the liquid lens are connected electrically and respectively to the first and second conducting members via the third and fourth conducting members when the adjusting seat is rotated relative to the base.

The present invention is further characterized in that the surrounding wall is annular. The first conducting member has a first ring portion fitted around the outer surface of the surrounding wall and abutting against the third conducting member, and a first conducting portion extending from a bottom end of the first ring portion to the bottom face of the base. The third conducting member has a first contact portion fitted around an outer surface of the first electrode portion, and a first resilient tab extending downward from a bottom end of the first contact portion through the first through hole and abutting against an outer surface of the first ring portion.

The present invention is further characterized in that the second conducting member has a second ring portion abutting against the inner surface of the surrounding wall and the fourth conducting member, and a second conducting portion extending from a bottom end of the second ring portion to the bottom face of the base. The fourth conducting member has a second contact portion abutting against the second electrode portion, and a second resilient tab extending downward from the second contact portion through the second through hole and abutting against an inner surface of the second ring portion.

The present invention is further characterized in that the base includes a first limiting groove provided in the top face and located at one side of the opening, and a first post hole extending from one end of the first limiting groove to the bottom face. The first conducting portion includes a first limiting tab extending radially outward from the bottom end of the first ring portion and received in the first limiting groove, and a first guide post coupled to the first limiting tab and extending into the first post hole. The base further includes a second limiting groove provided in the top face, located at the other side of the opening, and extending to the inner surface of the surrounding wall, and a second post hole extending from one end of the second limiting groove to the bottom face. The second conducting portion includes a second limiting tab extending radially outward from the bottom end of the second ring portion and received in the second limiting groove, and a second guide post coupled to the second limiting tab and extending into the second post hole.

The present invention is further characterized in that the adjusting seat has a base wall, a first surrounding wall segment extending upward from an outer periphery of the base wall, and a second surrounding wall segment extending downward from a bottom face of the base wall and coupled to the base. The liquid lens is received within the first surrounding wall segment. The fixed lens set is received within the second surrounding wall segment. The base includes an internally threaded portion, and the adjusting seat has an externally threaded portion surrounding an outer surface of the second surrounding wall segment and threadedly engaging the internally threaded portion. The first and second through holes are formed respectively in the base wall.

In the image capturing device of the present invention, by arranging the first conducting member and the second conducting member of the electrically conducting mechanism on the base, and by arranging the third and fourth conducting members in the adjusting seat, the first and second resilient tabs of the third and fourth conducting members can maintain contact with the outer surface of the first ring portion of the first conducting member and with the inner surface of the second ring portion of the second conducting member, respectively, so that the adjusting seat can be conveniently and quickly rotated relative to the base for focus adjustment. Moreover, during the process of rotating the adjusting seat, the first and second resilient tabs of the third and fourth conducting members can maintain contact with the first ring portion of the first conducting member and the second ring portion of the second conducting member, respectively. Thus, after focus adjustment of the fixed lens set and the liquid lens, the circuit board can, via the electrically conducting mechanism, supply alternating current power to drive operation of the liquid lens, thereby enabling the liquid lens to perform an auto-focusing function.

BRIEF DESCRIPTION OF THE DRAWINGS

Other features and advantages of the present invention will become apparent in the following detailed description of the preferred embodiments with reference to the accompanying drawings, of which:

FIG. 2 is a perspective view of the first preferred embodiment of an image capturing device according to the present invention;

DETAILED DESCRIPTION OF THE PREFERRED EMBODIMENTS

Figure 1:
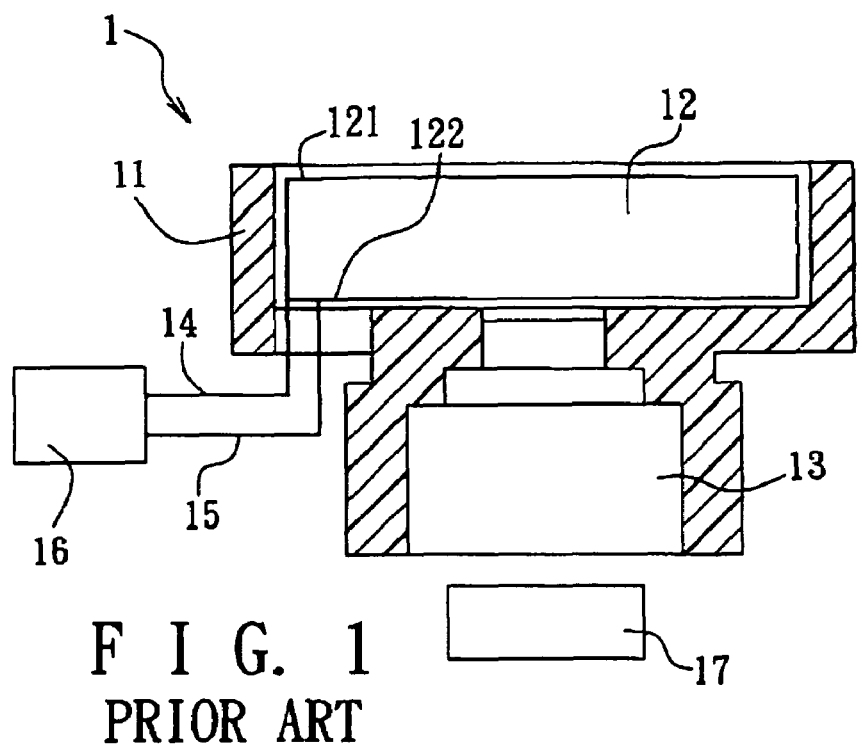
FIG. 1 is a schematic partly sectional view of a conventional image capturing device.

Before the present invention is described in greater detail, it should be noted that like elements are denoted by the same reference numerals throughout the disclosure.

Figure 3:
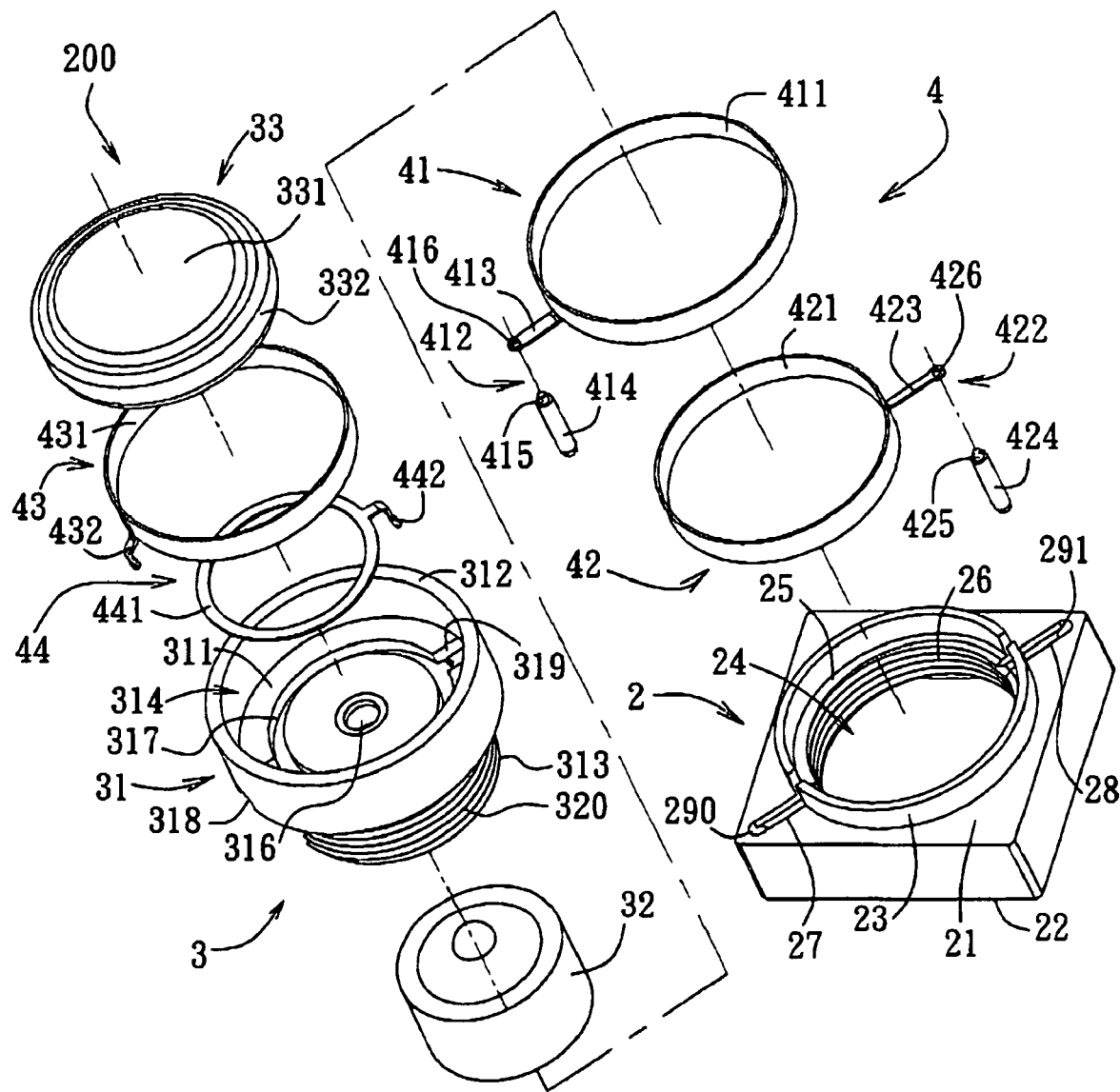
FIG. 3 is an exploded perspective view of the first preferred embodiment.

FIGS. 2 and 3 illustrate the first preferred embodiment of an image capturing device 200 according to the present invention. The image capturing device 200 is applied to hand-held type electronic equipment, such as a mobile phone, a personal digital assistant (PDA), etc. The image capturing device 200 includes a base 2, a lens module 3 coupled to the base 2, and an electrically conducting mechanism 4.

Figure 4:
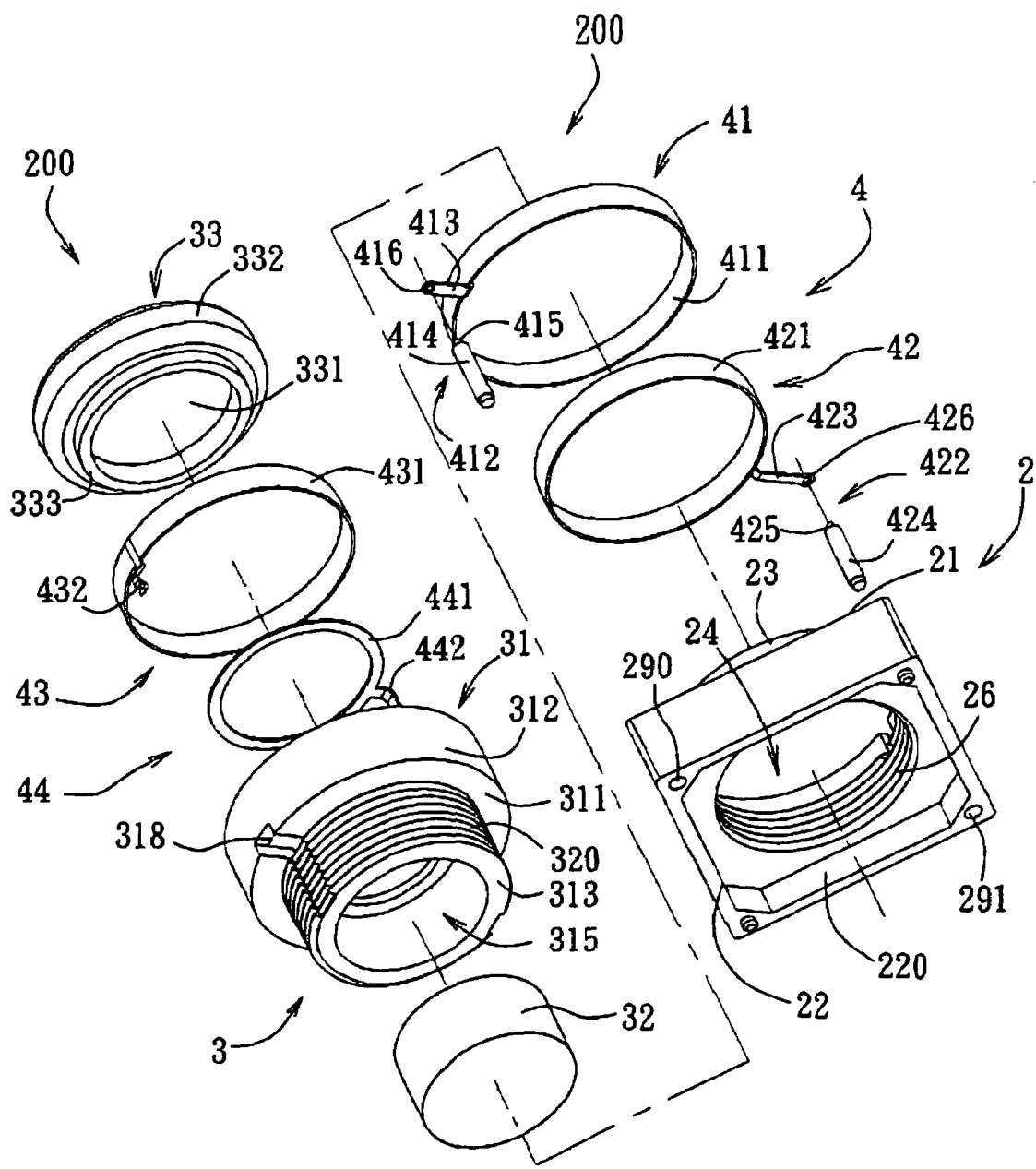
FIG. 4 is another exploded perspective view of the first preferred embodiment.
Figure 5:
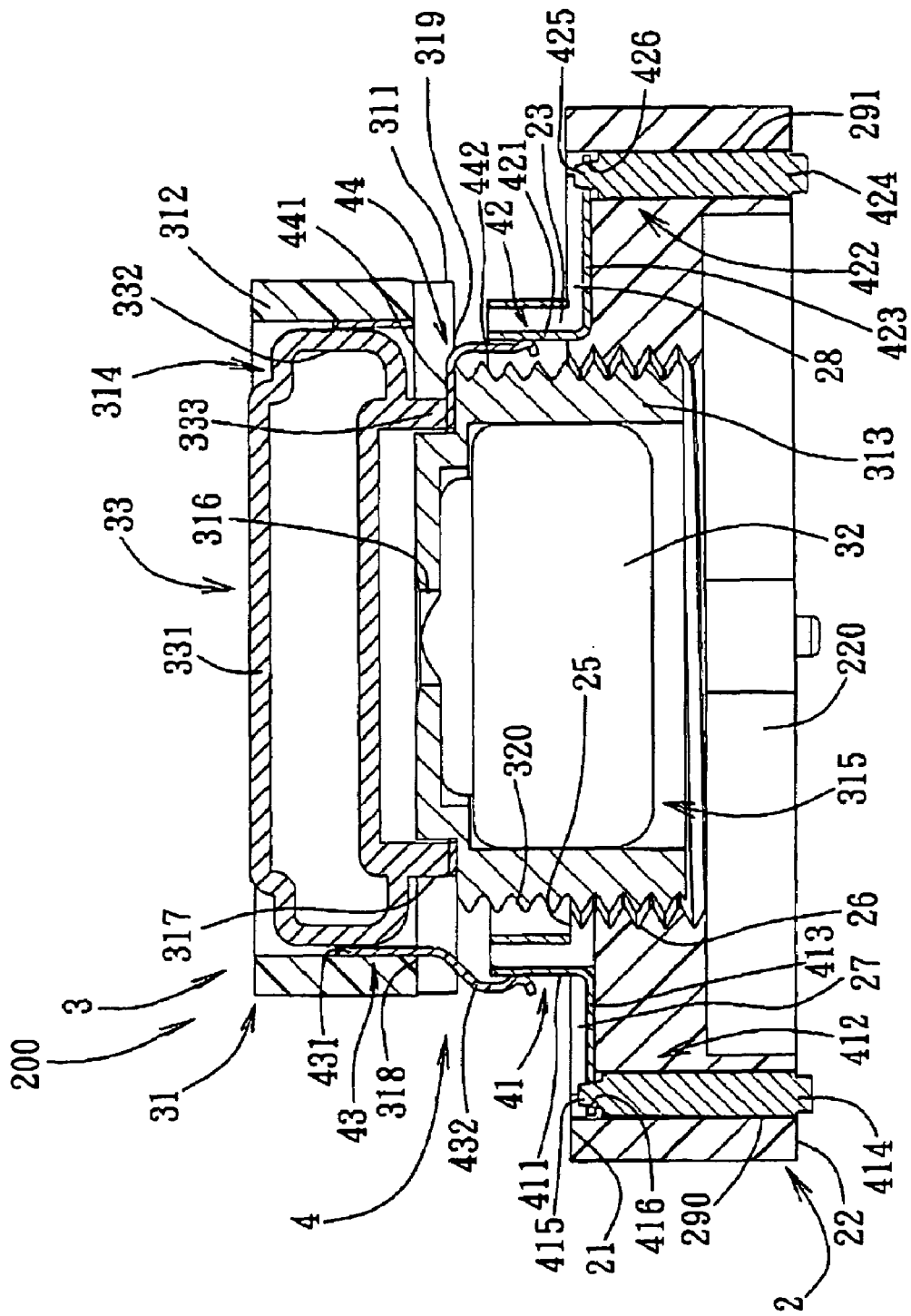
FIG. 5 is a partly sectional view taken along line 5-5 of FIG. 2.

As shown in FIGS. 3, 4, and 5, the base 2, which is formed from a plastic material and is hollow, includes a top face 21, a bottom face 22, an annular surrounding wall 23 extending upward from the top face 21, and an opening 24 formed in the top face 21 and located within the surrounding wall 23. The bottom face 22 of the base 2 is formed with an access space 220 that is communicated with the opening 24. The base 2 further includes a shoulder 25 defining the opening 24, and an internally threaded portion 26 located below the shoulder 25. The base 2 additionally includes first and second limiting grooves 27, 28 formed in the top face 21 and located at opposite sides of the opening 24, and first and second post holes 290, 291 extending vertically and respectively from outer ends of the first and second limiting grooves 27, 28 to the bottom face 22. The first and second limiting grooves 27, 28 extend through the surrounding wall 23 to the shoulder 25.

The lens module 3 includes an adjusting seat 31 formed from a plastic material and coupled to the base 2, and a fixed lens set 32 and a liquid lens 33 disposed within the adjusting seat 31. The adjusting seat 31 has a circular base wall 311, a first surrounding wall segment 312 extending upward from an outer periphery of the base wall 311, and a second surrounding wall segment 313 extending downward from a bottom face of the base wall 311. The base wall 311 and the first surrounding wall segment 312 cooperatively define a first receiving space 314 for receiving the liquid lens 33. The base wall 311 and the second surrounding wall segment 313 cooperatively define a second receiving space 315 for receiving the fixed lens set 32. In addition, the base wall 311 includes a central opening 316 communicated with the first and second receiving spaces 314, 315, and an annular positioning groove 317 that opens upward. The base wall 311 is provided with a first through hole 318 proximate to the first surrounding wall segment 312, and a second through hole 319 disposed opposite to the first through hole 318. The first and second through holes 318, 319 communicate the positioning groove 317 with an outer portion of a bottom side of the base wall 311. An outer surface of the second surrounding wall segment 313 is provided with an externally threaded portion 320 that threadedly engages the internally threaded portion 26 of the base 2 such that the adjusting seat 31 is rotatable relative to the base 2 within a certain range for focus adjustment of the fixed lens set 32 and the liquid lens 33 at the same time.

The fixed lens set 32 is composed of a plurality of optical lenses (not shown) for focusing the image of an object (not shown) to be captured at a point in infinity. The liquid lens 33 includes a lens body 331, a first electrode portion 332 surrounding an outer peripheral face of the lens body 331, and a second electrode portion 333 provided at a bottom end of the lens body 331 and received in the positioning groove 317 in the adjusting seat 31. The liquid lens 33 is capable of autofocusing due to a change of curvature of a liquid therein after an alternating current voltage is applied to the first electrode portion 332 and the second electrode portion 333. Therefore, by virtue of the auto-focusing functionality of the liquid lens 33, when the image capturing device 200 is used to capture images of objects at different distances, the captured images can achieve the required image sharpness.

The electrically conducting mechanism 4 includes first and second conducting members 41, 42 for mounting on the base 2, and third and fourth conducting members 43, 44 for mounting on the adjusting seat 31. The first conducting member 41 is formed from copper, and has a first ring portion 411 to be fitted around an outer surface of the surrounding wall 23, and a first conducting portion 412 provided at a bottom end of the first ring portion 411. The first conducting portion 412 includes a first limiting tab 413 that extends integrally and radially outward from the bottom end of the first ring portion 411 and that is received in the first limiting groove 27, and a first guide post 414 that extends through the first post hole 290 and that abuts against the first limiting tab 413. The second conducting member 42 is also formed from copper, and is shaped to correspond to the first conducting member 41. The second conducting member 42 has a second ring portion 421 that is disposed on the shoulder 25 and that abuts against an inner surface of the surrounding wall 23, and a second conducting portion 422 provided at a bottom end of the second ring portion 421. The second conducting portion 422 includes a second limiting tab 423 that extends integrally and radially outward from the bottom end of the second ring portion 421 and that is received in the second limiting groove 28, and a second guide post 424 that extends through the second post hole 291 and that abuts against the second limiting tab 423. It is noted that the first and second limiting tabs 413, 423 may be formed integrally with the first and second guide posts 414, 424, respectively, and should not be limited to the disclosure of this embodiment, in which they are separately formed.

The third conducting member 43 is formed from copper, and includes a first contact portion 431 to be fitted around an outer surface of the first electrode portion 332 of the liquid lens 33, and a first resilient tab 432 that extends integrally downward from a bottom end of the first contact portion 431 and that extends through the first through hole 318. The fourth conducting member 44 is formed from copper, and includes a second contact portion 441 that is received in the positioning groove 317, and a second resilient tab 442 that extends integrally downward from one side of the second contact portion 441 and that extends through the second through hole 319. It is noted that the first and second conducting members 41, 42 and the third and fourth conducting members 43, 44 may be formed from other materials with excellent electrical conducting properties, and should not be limited to the disclosure of this embodiment, in which they are formed from copper.

When assembling the image capturing device 200, the second conducting member 42 is first placed on the shoulder 25 of the base 2 such that the second ring portion 421 of the second conducting member 42 abuts against the inner surface of the surrounding wall 23, and the second limiting tab 423 of the second conducting member 42 is received in the second limiting groove 28. Moreover, the second guide post 424 is extended from the bottom face 22 of the base 2 into the second post hole 291 such that a projection 425 on a top end of the second guide post 424 extends through a hole portion 426 of the second limiting tab 423. Subsequently, the first conducting member 41 is fitted on the surrounding wall 23 such that the first ring portion 411 of the first conducting member 41 abuts against the outer surface of the surrounding wall 23, and the first limiting tab 413 thereof is received in the first limiting groove 27. Moreover, the first guide post 414 is extended from the bottom face 22 of the base 2 into the first post hole 290, and a projection 415 on a top end of the first guide post 414 is extended through a hole portion 416 of the first limiting tab 413. Subsequently, conductive glue or solder is applied to where the projections 415, 425 of the first and second guide posts 414, 424 respectively come into contact with the hole portions 416, 426 of the first and second limiting tabs 413, 423 to ensure that the first and second guide posts 414, 424 are adhered respectively to the first and second limiting tabs 413, 423, thereby completing assembly of the first and second conducting members 41, 42 to the base 2.

On the other hand, the fixed lens set 32 is mounted in the second receiving space 315 of the adjusting seat 31. Subsequently, the second contact portion 441 of the fourth conducting member 44 is placed in the positioning groove 317, and the second resilient tab 442 of the fourth conducting member 44 is extended through the second through hole 319 so as to be exposed from the bottom face of the base wall 311 of the adjusting seat 31. Thereafter, the first contact portion 431 of the third conducting member 43 is fitted around the outer surface of the first electrode portion 332 of the liquid lens 33, and the third conducting member 43 and the liquid lens 33 thus assembled are mounted in the first receiving space 314 of the adjusting seat 31 such that the second electrode portion 333 of the liquid lens 33 is received in the positioning groove 317 and abuts against an upper surface of the second contact portion 441 of the fourth conducting member 44. At the same time, the first resilient tab 432 of the third conducting member 43 is extended through the first through hole 318 so as to be exposed from the bottom face of the base wall 311 of the adjusting seat 31, thereby completing assembly of the lens module 3 and the third and fourth conducting members 43, 44. It is noted that the first and second contact portions 431, 441 of the third and fourth conducting members 43, 44 may be designed to have different shapes so as to be able to abut respectively against the bottom face of the first electrode portion 332 and the outer surface of the second electrode portion 333, and should not be limited to the disclosure in this embodiment, in which the first contact portion 431 abuts against the outer surface of the first electrode portion 332 and the second contact portion 441 abuts against a lower surface of the second electrode portion 333.

Finally, the adjusting seat 31 of the lens module 3 is threadedly engaged with the base 2, with the first resilient tab 432 of the third conducting member 43 abutting against an outer surface of the first ring portion 411 of the first conducting member 41 and with the second resilient tab 442 of the fourth conducting member 44 abutting against an inner surface of the second ring portion 421 of the second conducting member 42, thereby completing assembly of the image capturing device 200.

During the process of production, the base 2 of the image capturing device 200 thus assembled is mounted on a circuit board (not shown) for optical focus adjustment of the lens module 3. The circuit board is provided with an optical sensor element (not shown) that is located below the fixed lens set 32, and the circuit board has two conductive contacts (not shown) that can respectively contact bottom ends of the first and second guide posts 414, 424. Since both the fixed lens set 32 and the liquid lens 33 are disposed in the adjusting seat 31, when the adjusting seat 31 is rotated relative to the base 2 to perform optical locus adjustment, there is no need to additionally provide power for driving operation of the liquid lens 33. When the image outputted to a computer screen (not shown) by the optical sensor element is in a sharpest state, this indicates that optimal focus adjustment of the lens module 3 has been achieved. By mounting both the fixed lens set 32 and the liquid lens 33 in the adjusting seat 31, different focus adjustments can be conducted in accordance with different application specifications and requirements during production of the image capturing device 200.

On the other hand, due to the arrangement of the third and fourth conducting members 43, 44 of the electrically conducting mechanism 4, during the process of rotating the adjusting seat 31 relative to the base 2 for focus adjustment, the first and second resilient tabs 432, 442 of the third and fourth conducting members 43, 44 can maintain contact with the outer surface of the first ring portion 411 of the first conducting member 41 and the inner surface of the second ring portion 421 of the second conducting member 42, respectively, such that, after optimal focus adjustment of the lens module 3, the conductive contacts on the circuit board can provide, through the electrically conducting mechanism 4, alternating current power to drive operation of the liquid lens 33, thereby enabling the liquid lens 33 to perform an auto-focusing function. In addition, due to the arrangement of the first and second conducting members 41, 42 of the electrically conducting mechanism 4 on the base 2, and due to the arrangement of the third and fourth conducting members 43, 44 in the adjusting seat 3, assembly is not only convenient, assembly time can also be reduced. Furthermore, since the process for assembling the image capturing device 200 is similar to that for assembling conventional cameras with fixed lenses, facility and yield in connection with the production of the image capturing device 200 can be enhanced.

Figure 6:
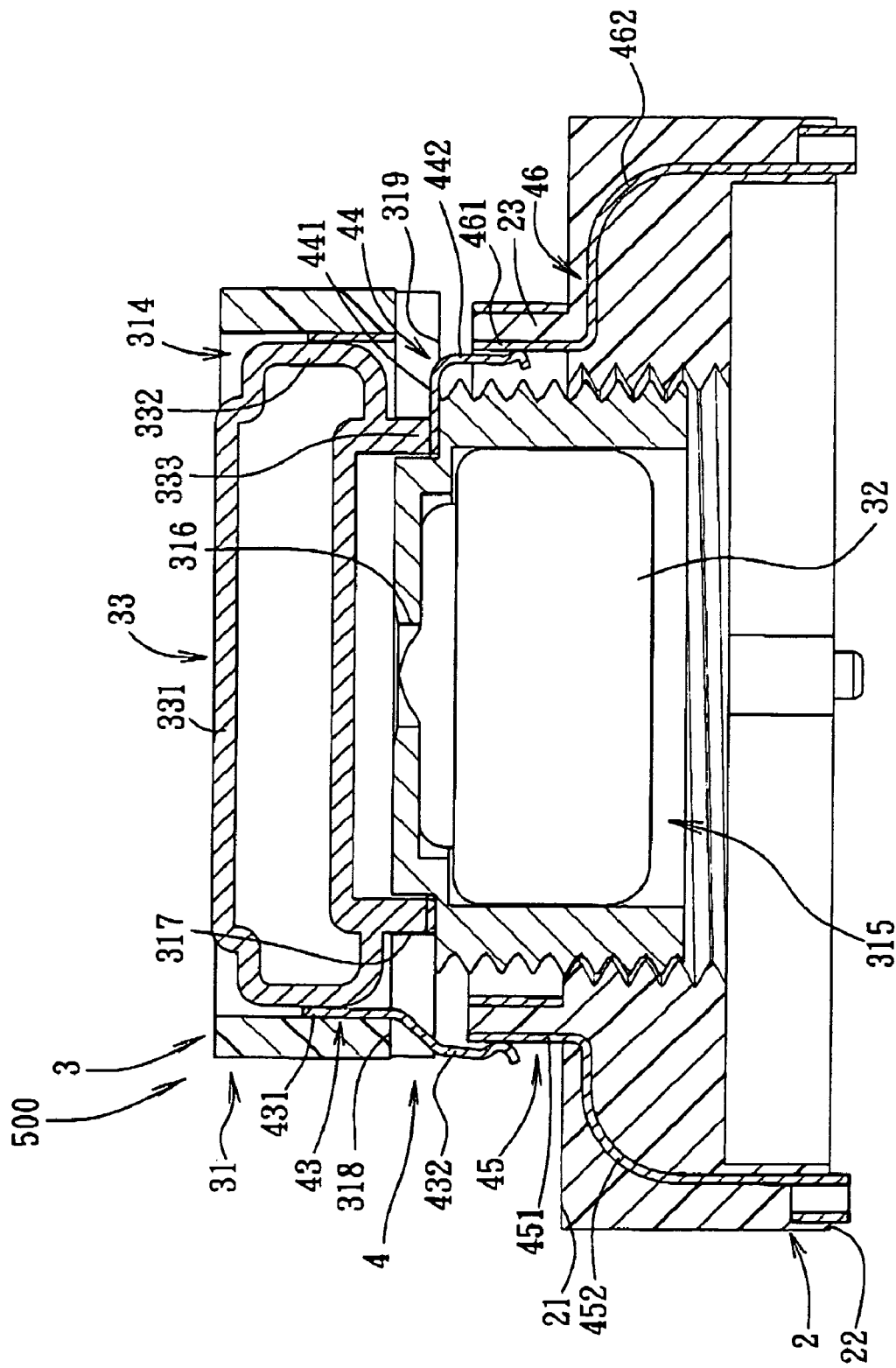
FIG. 6 is a partly sectional view of the second preferred embodiment of an image capturing device according to the present invention.

FIG. 6 illustrates the second preferred embodiment of an image capturing device 500 according to the present invention. The image capturing device 500 is substantially similar to the image capturing device 200 in overall construction and assembly, except that assembly of the first and second conducting members 45, 46 of the electrically conducting mechanism 4 in this embodiment is different from that described above in connection with the previous embodiment. The first and second ring portions 451, 461 of the first and second conducting members 45, 46, and the first and second conducting portions 452, 462 are formed by insert molding to surround the outer and inner surfaces of the surrounding wall 23, respectively. Moreover, the first and second conducting portions 452, 462 in the base 2 respectively extend a certain distance outward from the bottom ends of the first and second ring portions 451, 461 and further bend downward to the bottom face 22 of the base 2. The bottom ends of the first and second conducting portions 452, 462 are partly exposed from the bottom face 22 of the base 2.

In sum, in the image capturing devices 200, 500 according to the two embodiments, by providing both the fixed lens set 32 and the liquid lens 33 on the adjusting seat 31, optimal focus adjustment of the lens module 3 can be achieved when the adjusting seat 31 is rotated relative to the base 2. In addition, by arranging the first conducting member 41, 45 and the second conducting member 42, 46 of the electrically conducting mechanism 4 on the base 2, and by arranging the third and fourth conducting members 43, 44 in the adjusting seat 31, the first and second resilient tabs 432, 442 of the third and fourth conducting members 43, 44 can maintain contact with the outer surface of the first ring portion 411, 451 of the first conducting member 41, 45 and with the inner surface of the second ring portion 421, 461 of the second conducting member 42, 46, respectively, so that the adjusting seat 31 can be conveniently and quickly rotated relative to the base 2 for focus adjustment. Moreover, during the process of rotating the adjusting seat 31, the first and second resilient tabs 432, 442 of the third and fourth conducting members 43, 44 can maintain contact with the first ring portion 411, 451 of the first conducting member 41, 45 and the second ring portion 421, 461 of the second conducting member 42, 46, respectively. Thus, after focus adjustment of the fixed lens set 32 and the liquid lens 33, the circuit board can, via the electrically conducting mechanism 4, supply alternating current power to drive operation of the liquid lens 33, thereby enabling the liquid lens 33 to perform an auto-focusing function. On the other hand, because the first and second conducting members 41, 42 of the image capturing device 200 and the first and second conducting members 45, 46 of the image capturing device 500 are different in configuration, flexibility in manufacture and use is made possible.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. An image capturing device, comprising:
a base including a top face, a bottom face, a surrounding wall extending upward from said top face, and an opening formed in said top face and located within said surrounding wall, said bottom face of said base being formed with an access space that is communicated with said opening;
a lens module including an adjusting seat that extends partly through said opening, and that is coupled rotatably to said base, a fixed lens set provided within said adjusting seat, and a liquid lens provided within said adjusting seat, said adjusting seat having spaced-apart first and second through holes, said liquid lens having first and second electrode portions; and
an electrically conducting mechanism including a first conducting member surrounding an outer surface of said surrounding wall, a second conducting member surrounding an inner surface of said surrounding wall, a third conducting member provided within said adjusting seat, abutting against said first electrode portion, and extending partly through said first through hole so as to contact said first conducting member, and a fourth conducting member disposed within said adjusting seat, spaced apart from said third conducting member, abutting against said second electrode portion, and extending partly through said second through hole so as to contact said second conducting member, said first and second electrode portions of said liquid lens being connected electrically and respectively to said first and second conducting members via said third and fourth conducting members when said adjusting seat is rotated relative to said base.

2. The image capturing device according to claim 1, wherein said surrounding wall is annular.

3. The image capturing device according to claim 2, wherein said first conducting member has a first ring portion fitted around said outer surface of said surrounding wall and abutting against said third conducting member, and a first conducting portion extending from said first ring portion to said bottom face of said base.

4. The image capturing device according to claim 3, wherein said third conducting member has a first contact portion fitted around an outer surface of said first electrode portion, and a first resilient tab extending from said first contact portion through said first through hole and abutting against said first ring portion.

5. The image capturing device according to claim 3, wherein said base includes a first limiting groove provided in said top face and located at one side of said opening, and a first post hole extending from said first limiting groove to said bottom face, said first conducting portion including a first limiting tab extending radially outward from said first ring portion and received in said first limiting groove, and a first guide post coupled to said first limiting tab and extending into said first post hole.

6. The image capturing device according to claim 2, wherein said second conducting member has a second ring portion abutting against said inner surface of said surrounding wall and said fourth conducting member, and a second conducting portion extending from said second ring portion to said bottom face of said base.

7. The image capturing device according to claim 6, wherein said fourth conducting member has a second contact portion abutting against said second electrode portion, and a second resilient tab extending from said second contact portion through said second through hole and abutting against said second ring portion.

8. The image capturing device according to claim 6, wherein said base includes a second limiting groove provided in said top face, located at one side of said opening, and extending to said inner surface of said surrounding wall, and a second post hole extending from said second limiting groove to said bottom face, said second conducting portion including a second limiting tab extending radially outward from said second ring portion and received in said second limiting groove, and a second guide post coupled to said second limiting tab and extending into said second post hole.

9. The image capturing device according to claim 2, wherein said adjusting seat has a base wall, a first surrounding wall segment extending upward from said base wall, and a second surrounding wall segment extending downward from said base wall and coupled to said base, said liquid lens being received within said first surrounding wall segment, said fixed lens set being received within said second surrounding wall segment.

10. The image capturing device according to claim 9, wherein said base includes an internally threaded portion, said adjusting seat having an externally threaded portion surrounding an outer surface of said second surrounding wall segment and threadedly engaging said internally threaded portion.

11. The image capturing device according to claim 9, wherein said first and second through holes are formed respectively in said base wall.

* * * * *